United States Patent
Dunser et al.

(10) Patent No.: US 9,743,485 B2
(45) Date of Patent: Aug. 22, 2017

(54) DEVICE FOR OPERATING LEDS

(71) Applicants: TRIDONIC GMBH & CO KG;
TRIDONIC JENNERSDORF GMBH,
Jennersdorf (AT)

(72) Inventors: Mathias Dunser, Feldkirch (AT);
Florian Moosmann, Dornbirn (AT);
Norbet Kleber, Dornbirn (AT);
Christian Nesensohn, Gotzis (AT);
Frank Lochmann, Esseratsweiler (DE);
Reinhold Juen, Dornbirn (AT); Gunter Marent, Bartholomaberg (AT); Frank Horn, Engi (CH); Peter Pachler, Graz (AT); John Schonberger, Reichenburg (CH); Steffen Riemer,
Krottendorf-Gaisfeld (AT)

(73) Assignees: TRIDONIC GMBH & CO KG,
Dornbirn (AT); TRIDONIC JENNERSDORF GMBH, Jennersdorf (AT)

( * ) Notice: Subject to any disclaimer, the term of this patent is extended or adjusted under 35 U.S.C. 154(b) by 0 days.

(21) Appl. No.: 14/761,531

(22) PCT Filed: Jan. 31, 2014

(86) PCT No.: PCT/AT2014/000022
§ 371 (c)(1),
(2) Date: Jul. 16, 2015

(87) PCT Pub. No.: WO2014/117193
PCT Pub. Date: Aug. 7, 2014

(65) Prior Publication Data
US 2015/0351173 A1    Dec. 3, 2015

(30) Foreign Application Priority Data

Jan. 31, 2013    (AT) .................. GM 29/2013

(51) Int. Cl.
*H05B 33/08* (2006.01)
*A21C 3/04* (2006.01)
*H05B 37/02* (2006.01)

(52) U.S. Cl.
CPC ............ *H05B 33/089* (2013.01); *A21C 3/04* (2013.01); *H05B 33/0869* (2013.01); *H05B 33/0872* (2013.01); *H05B 37/0254* (2013.01)

(58) Field of Classification Search
CPC .. H05B 37/029; H05B 37/02; H05B 41/3925; H05B 41/391; H05B 41/2828; H05B 33/0803
(Continued)

(56) References Cited

U.S. PATENT DOCUMENTS 6,490,512 B1    12/2002    Niggemann
8,949,665 B2    2/2015    Law et al.
(Continued)

FOREIGN PATENT DOCUMENTS

CA    WO 2006056066 A1 *    6/2006    ............. F21S 6/007
CH    2375858 A1 *    10/2011    ......... H05B 33/0893
(Continued)

OTHER PUBLICATIONS

Translation of EP 2375858A.*

*Primary Examiner* — Douglas W Owens
*Assistant Examiner* — Syed M Kaiser
(74) *Attorney, Agent, or Firm* — Volpe and Koenig, P.C.

(57) ABSTRACT

The invention relates to a device for operating LEDs, comprising a driver module and an LED module (11), which is controlled by the driver module (10) and has at least one LED. The LED module (11) is fed a current by the driver module (10) via a first connection (1), and a second connection (2) is present, preferably as a ground connection (GND). The device is characterized in that the LED module
(Continued)

(11) is connected to the driver module (10) by means of a third connection (3), which is designed as a data channel, a voltage fed by the driver module (10) being applied to the data channel.

23 Claims, 2 Drawing Sheets

(58) Field of Classification Search
USPC .............. 315/294, 291, 297, 307, 246, 130
See application file for complete search history.

(56) References Cited

U.S. PATENT DOCUMENTS

| | | | | |
|---|---|---|---|---|
| 2009/0289579 A1* | 11/2009 | Zielinski | ............ | H05B 33/086 315/294 |
| 2010/0176733 A1* | 7/2010 | King | ............ | H05B 37/0245 315/158 |
| 2011/0133655 A1* | 6/2011 | Recker | ............ | H02J 9/02 315/159 |
| 2012/0080944 A1* | 4/2012 | Recker | ............ | H02J 9/02 307/25 |
| 2012/0119698 A1* | 5/2012 | Karalis | ............ | B60L 11/182 320/108 |
| 2012/0153733 A1* | 6/2012 | Schatz | ............ | B60L 3/0069 307/104 |
| 2012/0153734 A1* | 6/2012 | Kurs | ............ | B60L 3/0069 307/104 |
| 2012/0153735 A1* | 6/2012 | Karalis | ............ | B60L 3/0069 307/104 |
| 2012/0169231 A1* | 7/2012 | Dinc | ............ | B60Q 3/0293 315/77 |
| 2012/0206064 A1* | 8/2012 | Archenhold | ............ | H05B 33/0812 315/297 |
| 2012/0242501 A1* | 9/2012 | Tran | ............ | A61B 5/0024 340/870.02 |
| 2013/0193878 A1* | 8/2013 | Zimmermann | ............ | H05B 33/0842 315/307 |

FOREIGN PATENT DOCUMENTS

| | | | | |
|---|---|---|---|---|
| CN | 102081391 A | 6/2011 | | |
| DE | 102010031242 A1 | 9/2011 | | |
| DE | 102010050747 A1 | 5/2012 | | |
| DE | 102011113080 A1 | 8/2012 | | |
| EP | 1000806 A2 | 5/2000 | | |
| EP | 1604865 A1 | 12/2005 | | |
| EP | 1047575 B1 | 1/2006 | | |
| EP | 2375858 A1 | 10/2011 | | |
| IT | WO 2011067177 A1 * | 6/2011 | ......... | H05B 33/0803 |
| NL | WO 2008001274 A2 * | 1/2008 | ......... | G06F 3/1446 |
| WO | 2006056066 A1 | 6/2006 | | |
| WO | 2008001274 A2 | 1/2008 | | |
| WO | 2008061560 A1 | 5/2008 | | |
| WO | 2009011898 A2 | 1/2009 | | |
| WO | 2011067177 A1 | 6/2011 | | |
| WO | 2011087684 A1 | 7/2011 | | |

* cited by examiner

DEVICE FOR OPERATING LEDS

FIELD OF THE INVENTION

The invention relates to a device for operating LEDs and to a method for operating LEDs.

Such devices are used in lighting systems in order to achieve a colored or planar illumination of spaces, paths or escape routes. In this case, the illuminants are usually driven by operating devices and activated as necessary. For such an illumination, organic or inorganic light emitting diodes (LEDs) are used as light source.

BACKGROUND

For lighting purposes, instead of gas discharge lamps and incandescent lamps, light emitting diodes are increasingly being used as light sources. The efficiency and luminous efficiency of light emitting diodes is being increased to a greater and greater extent, such that they are already used in various applications for general lighting. However, light emitting diodes are spot light sources and emit highly focused light.

Present-day LED lighting system often have the disadvantage, however, that the color emission or the brightness can vary on account of aging or as a result of replacement of individual LEDs or LED modules.

Moreover, the secondary optics influence the thermal management since the heat emission is impeded. Moreover, a variation of the phosphor of the LED can occur on account of aging and heat effect.

SUMMARY

The object of the invention is to provide an illuminant and a method which enable the uniform and true-color illumination of an area by an illuminant with light emitting diodes without the abovementioned disadvantages or with a significant reduction of these disadvantages.

This object is achieved for a device of the generic type and for a method according to the invention by means of the characterizing features of the independent claims. Particularly advantageous embodiments of the invention are described in the dependent claims.

The solution according to the invention for a device for operating LEDs (organic or inorganic light emitting diodes) is based on the concept that an LED module having at least one LED is driven by a driver module, wherein the LED module is fed with a current by the driver module via a first terminal and a second terminal is preferably present as a ground connection. The LED module has a third terminal, which is embodied as a data channel. The third terminal is connected to the driver module, wherein a voltage fed by the driver module is present on the data channel.

In this way it is possible to achieve a very constant and uniform illumination of an area by an illuminant with light emitting diodes.

The solution according to the invention also relates to a device for operating LEDs, comprising a driver module and an LED module having at least one LED, said LED module being driven by the driver module, wherein the LED module is fed with a current by the driver module via a first terminal, and a second terminal is present, preferably as a ground connection, wherein the LED module is connected to the driver module via a third terminal, which is embodied as a data channel, wherein a voltage fed by the driver module is present on the data channel.

The LED module can be designed to short-circuit the voltage at the data channel for the transmission of information.

The information transmitted by the LED module can contain an indication about a parameter of the LED module or the status of the LED module.

The voltage at the data channel can be used for feeding a logic circuit on the LED module.

The voltage at the data channel can be used for feeding a sensor which is arranged on the LED module or which is connected to the LED module.

The information transmitted by the LED module can include an indication about the status of the sensor or a signal detected by the sensor.

Address information can be transmitted via the data channel.

The driver module can also feed a voltage onto the data channel if the LED module is not fed with a current by the driver module via the first terminal.

The LED module can also transmit information if the LED module is not fed with a current by the driver module via the first terminal.

The LED module can have a memory which can be read by the driver module via the data channel.

The driver module can be designed to monitor the voltage at its output for the data channel and can evaluate a change in the voltage at said output as transfer of information.

The driver module can momentarily reduce the voltage at its output for the data channel, preferably in the form of a pulse-modulated signal, in order to transmit information to the driver module.

The driver module can regularly read the memory of the LED module and, after replacement of the LED module, the memory information read out can be stored in the memory of the new LED module.

The driver module can feed a plurality of LED modules via the same terminal for feeding with current and can exchange information with a plurality of LED modules via the same terminal for the data channel.

One or more LED modules can be switched off by virtue of corresponding switch-off information being transferred via the data channel to said LED modules and the latter thereupon interrupting the current through the LED.

The sensor can be a color sensor (e.g. CCD sensor) or brightness sensor.

The color sensor or brightness sensor can be positioned such that it can receive part of the light emitted by the LED modules. The color sensor or brightness sensor can that it is shielded from ambient light and can receive only light emitted by the LED modules.

The sensor can be a presence sensor or motion sensor.

A dummy load can be arranged on the LED module, said dummy load being connected to the terminal for the data channel, wherein said dummy load loads the data channel and this loading can be evaluated by the driver module as information from the LED module. The dummy load can be formed by a passive component, preferably a resistor.

The driver module can be designed to be able to receive both analog information, preferably on account of the loading with a dummy load, and digital information, preferably by means of pulse-width-modulated signals, from the LED module.

The invention also relates to a luminaire with LED, comprising a device according to the invention.

The invention also relates to a method for operating LEDs, wherein an LED module having at least one LED is driven by a driver module, and a data channel for transferring information about the LED module is present, wherein the data channel is preferably permanently fed with a voltage by the driver module and the LED module is designed to change, for example short-circuit or reduce by loading, the voltage at the data channel for the transmission of information.

The information from the LED module can be transmitted after a request by the driver module.

The data channel can also be fed with a voltage by the driver module in a standby mode, and a communication between LED module and driver module can also be possible in said standby mode. By way of example, a unidirectional or bidirectional communication between LED module and driver module can be possible.

BRIEF DESCRIPTION OF THE DRAWINGS

The invention will be explained in greater detail below with reference to the accompanying drawing, in which.

DETAILED DESCRIPTION OF THE PREFERRED EMBODIMENTS

Figure 1:
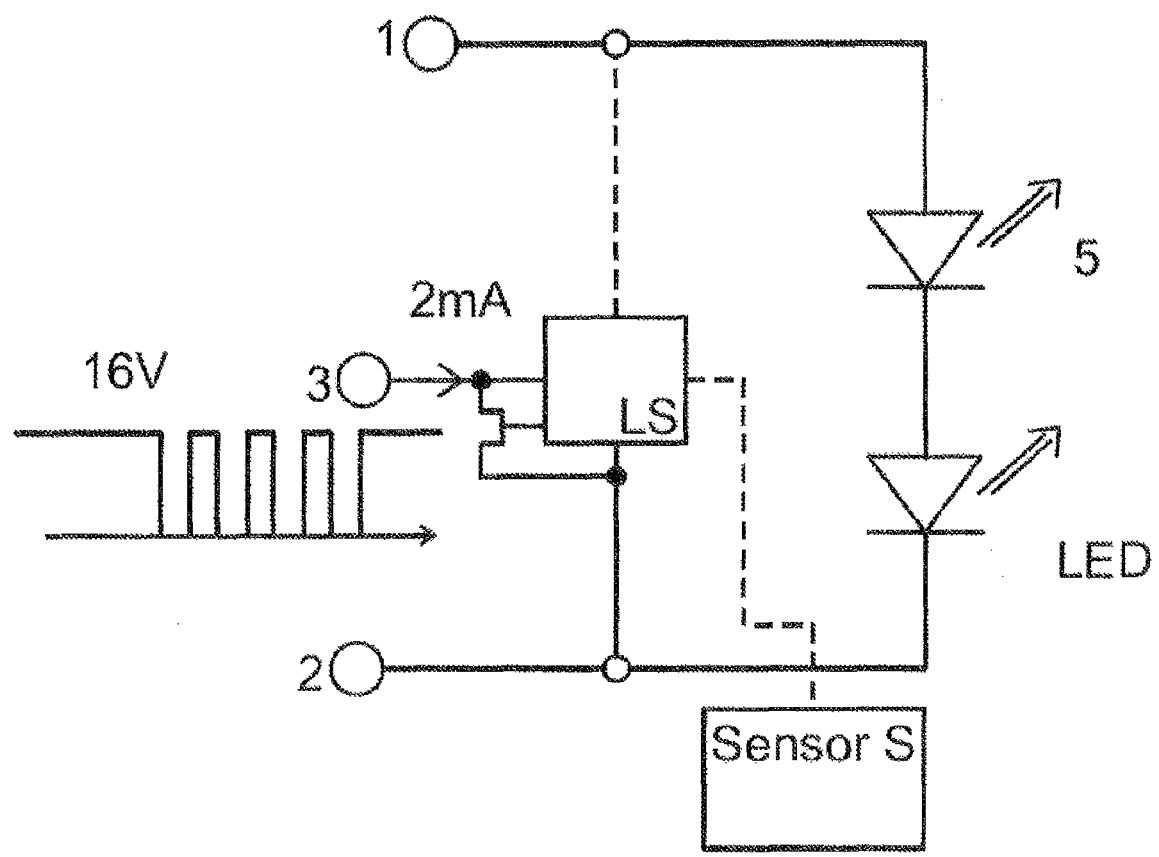
FIG. 1 shows one configuration of an LED module according to the invention.
Figure 2:
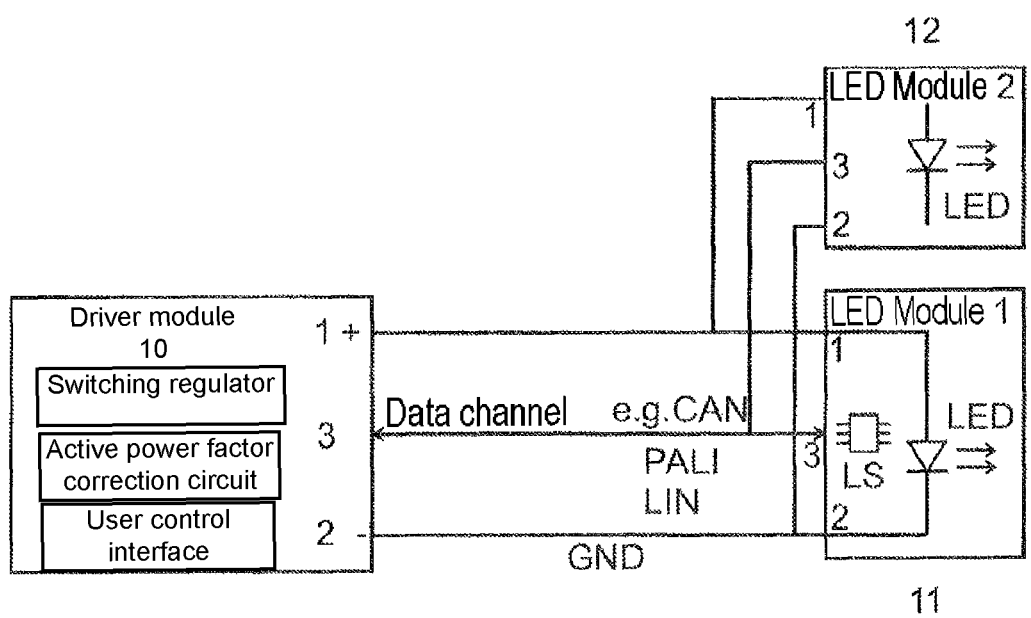
FIG. 2 shows one configuration of a device according to the invention.

FIG. 1 shows one configuration of the LED module 11 according to the invention, and FIG. 2 shows one configuration of the device according to the invention comprising two LED modules (LED module 11, LED module 21) and a driver module 10.

The invention is explained below on the basis of an exemplary embodiment of a device for operating LEDs. Said device comprises a driver module 10, and an LED module 10 having at least one LED 5, said LED module being driven by the driver module 10.

The driver module 10 has a first terminal, via which the LED module 11 connected thereto can be fed with a current by the driver module 10. Said current serves for feeding the LED. Furthermore, the driver module 10 has a second terminal, which is present preferably as a ground connection (GND).

The LED module 11 has a first terminal 1, via which the LED module is fed with a current by the driver module 10, and a second terminal 2 preferably as a ground connection. A plurality of LEDs 5 can be situated on a common LED module 11.

The second terminal 2 can also form a virtual ground for the LED module 11; this is intended to mean that this can form a local ground reference point for the LED module 11, wherein this local ground reference point need not be the ground of the driver module 10. By way of example, it may be the case that components are arranged between the ground and the second terminal 2 of the driver module 10. In this case, the second terminal 2 on the driver module 10 is not directly connected to ground; nevertheless, the second terminal 2 connected thereto, on the LED module 11, can act like a local ground if measurements on the LED module 11 are carried out with reference to this point.

The LED module 11 and also the driver module 10 have a third terminal 3, which is embodied as a data channel. Therefore, the terminals for the data channel of the LED module 11 and the driver module 10 are connected to one another. A voltage fed by the driver module 10 is present on the data channel.

The terminals of the driver module 10 and of the LED module 11 are connected via the wiring 4. A connection for feeding the LED is thus present alongside a ground connection, and a data channel.

The LED module 11 can be designed to short-circuit the voltage at the data channel for the transmission of information. This can be carried out for example by means of a switch S1, which momentarily short-circuits the third terminal (data channel) with the second terminal (local ground connection (GND)).

The information transmitted by the LED module 11 can contain an indication about a parameter of the LED module 11 or the status of the LED module 11.

By way of example, the driver module 10 can adapt its operation in accordance with the information transmitted by the LED module 11 and can for example correspondingly adapt the current with which the LED module 11 is fed via the first terminal 1.

The voltage at the data channel can be used for feeding a logic circuit (LS) on the LED module 11. The logic circuit can comprise a microcontroller, for example, which can monitor the voltage at the data channel and can also control the transmission of a signal on the data channel. By way of example, the logic circuit can drive a switch S1 which momentarily short-circuits the third terminal (data channel) with the second terminal (local ground connection (GND)).

The voltage can be used at the data channel for feeding a sensor S which is arranged on the LED module 11 or which is connected to the LED module 11. The information transmitted by the LED module 11 can include an indication about the status of the sensor S or a signal detected by the sensor S.

Address information can be transmitted via the data channel. In this way, when a plurality of LED modules are connected to a driver module 10, the individual LED modules can be identified and the LED modules can individually and selectively provide feedback messages (transmit specific information).

The information from the LED module 11 can be transmitted after a request by the driver module 10.

The driver module 10 can also feed a voltage onto the data channel (terminal 3) if the LED module 11 is not fed with a current by the driver module 10 via the first terminal 1. The LED module 11 can also transmit information if the LED module 11 is not fed with a current by the driver module 10 via the first terminal 1.

In this regard, the data channel 3 can also be fed with a voltage by the driver module 10 in a standby mode, and a communication between LED module 11 and driver module 10 is possible on in said standby mode.

The LED module 11 can have a memory which can be read by the driver module 10 via the data channel.

The driver module 10 can be designed to monitor the voltage at its output for the data channel (terminal 3) and a change in the voltage at said output can be evaluated as transfer of information. This evaluation of the voltage at the third terminal 3 (data channel) can therefore be used for receiving information that was transmitted by the LED module 11.

The driver module 10 can momentarily reduce the voltage at its output for the data channel, preferably in the form of a pulse-modulated signal, in order to transmit information to the LED module 11.

The driver module 10 can regularly read the memory of the LED module 11 and, after replacement of the LED module 11, the memory information read out is stored in the memory of the new LED module 11. The signaling for reading the memory on the LED module 11 can be carried out by the user by means of a switching sequence on the supply voltage, a digital control command or by means of some other signaling.

The driver module 10 can also forward the information stored in the memory, after read-out from an LED module 11, via the data channel to other LED modules as well.

The data channel can be designed for example for a communication between LED module 11 and driver module 10 in accordance with an existing protocol such as DALI, LJN or CAN or else some other defined protocol. The defined protocol can also be a specific protocol for the exchange of data between LED modules and driver modules.

The driver module 10 can feed a plurality of LED modules via the same first terminal 1 for feeding with current and exchange information with a plurality of LED modules via the same third terminal 3 for the data channel.

By way of example, one or a plurality of LED modules 11, 12 can be switched off by virtue of corresponding switch-off information being transferred via the data channel to said LED modules 11, 12 and the latter thereupon interrupting the current through the LED.

The sensor S can be a color sensor (e.g. CCD sensor or a photodiode with color filter). The color sensor can be positioned such that it can receive part of the light emitted by the LED modules. The color sensor can be positioned such that it is shielded from ambient light and can receive only light emitted by the LED modules. However, the sensor S can also be positioned on the reflector of the LED luminaire.

The sensor S can be positioned such that it directly or indirectly receives the light from the LED of the LED module.

The sensor S can be a brightness sensor (e.g. a photodiode). The sensor S can be an ambient light sensor or an artificial light sensor. The sensor S, for example an artificial light sensor can be positioned such that it is shielded from ambient light and can receive only light emitted by the LED modules. The sensor S can be positioned such that it directly or indirectly receives the light from the LED of the LED module. The sensor S, preferably as an ambient light sensor, can be positioned such that it can receive only ambient light and is shielded from light emitted by the LED modules. Such shielding can be achieved for example by means of a color filter or else by means of a physical separation such as, for example, a type of partition between LED and sensor S. The sensor S can also be positioned on the reflector of the LED luminaire.

The sensor S can also be a presence sensor or motion sensor. Additionally or alternatively, the sensor S can also be a temperature sensor.

The sensor S can also be formed by a combination of a plurality of different sensors. By way of example, a plurality of sensors can be situated in a housing, said sensors being evaluated by common electronics (also possible as a multichip arrangement).

An infrared sensor can also be present as sensor S, in order to receive control signals of an infrared remote control.

A radio receiver can also be present as sensor S, in order to receive control signals of a wireless controller such as, for example, a smartphone with radio transmitter (e.g. Bluetooth, Zigbee or WLAN) or a wireless light control transmitter (e.g. Wireless DALI).

If an at least one sensor S is arranged on the LED module 11 and the LED module 11 transmits information from the sensor S to the driver module 10 via the data channel, then the driver module 10 can adapt the operation of the LED module 11 in accordance with the received information. By way of example, it can increase the current through the LED if a presence sensor or motion sensor detects a person, or it can reduce the current if the ambient light overshoots a predefined minimum brightness.

If a temperature sensor is present on the LED module 11, the latter can also communicate an overtemperature as information to the driver module 10 via the data channel and the driver module 10 can thereupon reduce or else interrupt the current through the LED.

If a sensor S for receiving a control signal such as, for example, an infrared sensor or radio receiver is present, the brightness of the LED module 11 can also be controlled by means of said sensor S by virtue of the fact that the sensor S communicates the received control signal from the LED module 11 to the driver module 10 via the data channel and the driver module 10 then correspondingly adapts the feeding of the LED module via the first terminal 1, for example adapts the current for the LED in accordance with the predefinition of the control signal.

In this way, a wireless control of the system comprising driver module 10 and LED module 11 can be achieved, without a control line to an external controller such as, for example, a DALI bus line pair being required.

A dummy load can also be arranged on the LED module 11, said dummy load being connected to the terminal 3 for the data channel, wherein said dummy load loads the data channel and this loading can be evaluated by the driver module 10 as information from the LED module 11. The dummy load can preferably be formed by a passive component, preferably a resistor. In this case, the value of the dummy load represents a coding of a characteristic value of the LED module 11, for example, of an operating parameter or of the color or dominant wavelength of the LED module 11. By way of example, the value of the dummy load can represent information about the nominal operating current of the LED module 11.

By way of example, the resistance value of the dummy load can be in a linearly proportional or inversely proportional relation with respect to the nominal operating current of the LED module 11, or alternatively in an exponential or logarithmic relation with respect to the nominal operating current of the LED module 11.

The driver module 10 can be designed to receive both analog information, preferably on account of the loading with a dummy load, and digital information, preferably by means of pulse-width-modulated signals, from the LED module 11.

Consequently, it is also possible to construct a luminaire with LED, comprising a according to the invention A method for operating LEDs is also made possible, wherein an LED module 11 having at least one LED is driven by a driver module 10, and a data channel for transferring information via the LED module 11 is present, wherein the data channel is preferably permanently fed with a voltage by the driver module 10 and the LED module 11 is designed to change, for example short-circuit or reduce by loading, the voltage at the data channel for the transmission of information.

However, it would also be possible that the driver module 10 feeds the terminal 3 and thus the data channel with a voltage only after the start or switch-on, in order to read out information from the LED module 11 via the data channel within a start phase, and, after the start phase has elapsed or after the conclusion of the read-out of the information, the voltage at the third terminal is switched off and the data channel is thus deactivated again. In this case, it can also be possible that the data channel is repeatedly reactivated momentarily after a specific time, in order again to read out information from the LED module 11 or else to start an interrogation or to transmit specific information or else brightness commands or other instructions to the LED module 11. It would also be possible in this way to monitor aging or an operating period of the LED module 11.

The information from the LED module 11 can be transmitted after a request by the driver module 10.

Consequently, both a unidirectional communication and a bidirectional communication between the driver module 10 and one or a plurality of LED modules 11, 12 is possible according to the invention.

The data channel can also be fed with a voltage by the driver module 10 in a standby mode, and a communication between the LED module 11 and driver module 10 can also be possible in said standby mode, that is to say for example if the LEDs are switched off. Consequently, by way of example, further monitoring can be effected with the aid of one or a plurality of sensors of the LED module 11 even if the LEDs of the LED module 11 are switched off and no voltage is applied to the first input 1 for feeding the LED 5.

The LED module 11 can have a memory for storing information about the LED module 11, wherein the information in the memory can optionally also be modified.

The information in the memory can be modified on the basis of a calibration measurement. The information in the memory can be modified by a correction factor. The correction factor can be dependent on the aging or the operational duration of the LED module. The correction factor can be dependent on the temperature of the LED module.

The driver module 10 can contain a switching regulator, for example an AC/DC converter. The driver module 10 can contain a PFC (active power factor correction circuit). The driver module 10 can have a potential isolation. By way of example, the driver module 10 can have a potential-isolated switching regulator such as an isolated flyback converter or an isolated half-bridge converter. The driver module 10 can optionally have an interface for user control, for example for setting the brightness. Said interface can be designed for example for connection to a light control system such as DALI or DMX, for example.

What is claimed is:

1. A device for operating light emitting diodes (LEDs), comprising
   a driver module (10), wherein the driver module comprises: a switching regulator, an active power factor correction circuit, potential isolation and/or an interface for user control and
   an LED module (11) having at least one LED, said LED module being driven by the driver module (10),
   wherein the LED module (11) is fed with a current by the driver module (10) via a first terminal (1), and a second terminal (2) is present, as a ground connection (GND),
   and the LED module (11) is connected to the driver module (10) via a third terminal (3), which is embodied as a data channel, wherein a voltage fed by the driver module (10) is present on the data channel, wherein the LED module (11) is designed to short circuit the voltage at the data channel (3) for the transmission of information and wherein the information transmitted by the LED module (11) contains an indication about a parameter of the LED module (11) or the status of the LED module (11);
   and wherein the driver module (10) feeds the data channel (3) with a voltage only after switch-on of the LED module (11) to read out information from the LED module (11) via the data channel (3) within a start phase, and, after the start phase has elapsed or after the information has been read-out, the voltage at the third terminal (3) is switched off thereby deactivating the data channel (3); or the data channel (3) is repeatedly reactivated momentarily after a specific time period in order to again read-out information from the LED module (11).

2. The device for operating LEDs, as claimed in claim 1, wherein the voltage at the data channel is used for feeding a logic circuit on the LED module (11).

3. The device for operating LEDs, as claimed in claim 2, wherein the voltage at the data channel is used for feeding a sensor which is arranged on the LED module (11) or which is connected to the LED module (11).

4. The device for operating LEDs, as claimed in claim 3, wherein the information transmitted by the LED module (11) includes an indication about the status of the sensor or a signal detected by the sensor (S).

5. The device for operating LEDs, as claimed in claim 1, wherein address information is transmitted via the data channel.

6. The device for operating LEDs, as claimed in claim 1, wherein the driver module (10) also feeds a voltage onto the data channel if the LED module (11) is not fed with a current by the driver module (10) via the first terminal.

7. The device for operating LEDs, as claimed in claim 1, wherein the LED module (11) also transmits information if the LED module (11) is not fed with a current by the driver module (10) via the first terminal (1).

8. The device for operating LEDs, as claimed in claim 1, wherein the LED module (11) has a memory which can be read by the driver module (10) via the data channel.

9. The device for operating LEDs, as claimed in claim 1, wherein the driver module (10) is designed to monitor the voltage at an output (3) for the data channel and can evaluate a change in the voltage at said output (3) as transfer of information.

10. The device for operating LEDs, as claimed in claim 1, wherein the driver module (10) can momentarily reduce the voltage at its output (3) for the data channel, in the form of a pulse-modulated signal, in order to transmit information to the driver module (10).

11. The device for operating LEDs, as claimed in claim 8, wherein the driver module (10) can regularly read the memory of the LED module (11) and, after replacement of the LED module, the memory information read out is stored in the memory of the new LED module.

12. The device for operating LEDs, as claimed in claim 1, wherein the driver module (10) can feed a plurality of LED modules via the same terminal (1) for feeding with current and can exchange information with the plurality of LED modules via the same terminal (3) for the data channel.

13. The device for operating LEDs, as claimed in claim 1, wherein one or a plurality of LED modules can be switched off via corresponding switch off information being transferred via the data channel to said LED modules and the latter thereupon interrupting the current through the LED.

14. The device for operating LEDs, as claimed in claim 3, wherein the sensor (S) is a color sensor.

15. The device for operating LEDs, as claimed in claim 14, wherein the color sensor is positioned such that it can receive part of light emitted by the LED modules.

16. The device for operating LEDs, as claimed in claim 15, wherein the color sensor is positioned such that it is shielded from ambient light and can receive only light emitted by the LED modules.

17. The device for operating LEDs, as claimed in claim 3, wherein the sensor (S) is a presence sensor or motion sensor.

18. The device for operating LEDs, as claimed in claim 1, wherein a dummy load is arranged on the LED module (11), said dummy load being connected to the terminal (3) for the data channel, wherein said dummy load loads the data channel and this loading can be evaluated by the driver module (10) as information from the LED module (11).

19. The device for operating LEDs, as claimed in claim 18, wherein the dummy load is formed by a passive component.

20. The device for operating LEDs, as claimed in claim 9, wherein the driver module (10) is designed to be able to receive both analog information, on account of the loading with a dummy load, and digital information, by means of pulse width modulated signals, from the LED module (11).

21. A method for operating LEDs, wherein an LED module (11) having at least one LED is driven by a driver module (10), and a data channel for transferring information about the LED module (11) is present, wherein the driver module (10) comprises: a switching regulator, an active power factor correction circuit, potential isolation and/or an interface for user control; and wherein the LED module (11) is fed with a current by the driver module (10) via a first terminal (1), and a second terminal (2) is present, as a ground connection (GND); and the LED module (11) is connected to the driver module (10) via a third terminal (3), which is embodied as a data channel, wherein a voltage fed by the driver module (10) is present on the data channel, the method comprising:

feeding the data channel, permanently, with a voltage by the driver module (10) and using the LED module (11) to change, by short circuiting or reducing by loading, the voltage at the data channel for the transmission of information, wherein the information transmitted by the LED module (11) contains an indication about a parameter of the LED module (11) or the status of the LED module (11); and wherein the driver module (10) feeds the data channel (3) with a voltage only after switch-on of the LED module (11) to read out information from the LED module (11) via the data channel (3) within a start phase, and, after the start phase has elapsed or after the information has been read-out, the voltage at the third terminal (3) is switched off thereby deactivating the data channel (3); or the data channel (3) is repeatedly reactivated momentarily after a specific time period in order to again read-out information from the LED module (11).

22. The method for operating LEDs, as claimed in claim 21, wherein the information is transmitted by the LED module (11) after a request by the driver module (10).

23. The method for operating LEDs, as claimed in claim 21, wherein the data channel is also fed with a voltage by the driver module (10) in a standby mode, and a communication between LED module (11) and driver module (10) is also possible in said standby mode.

* * * * *